US005339515A

United States Patent [19]

Brackett et al.

[11] Patent Number: 5,339,515

[45] Date of Patent: * Aug. 23, 1994

[54] APPARATUS FOR REMOVING AND INSTALLING VALVE-SPRING RETAINER ASSEMBLIES AND FOR TESTING THE TENSION OF SPRINGS EMPLOYED THEREBY

[76] Inventors: Douglas C. Brackett, P.O. Box 306; William H. Webster, P.O. Box 4850, both of Portland, Me. 04112

[ * ] Notice: The portion of the term of this patent subsequent to Sep. 7, 2010 has been disclaimed.

[21] Appl. No.: 954,007

[22] Filed: Sep. 30, 1992

Related U.S. Application Data

[63] Continuation-in-part of Ser. No. 911,283, Jul. 9, 1992, Pat. No. 5,241,734.

[51] Int. Cl.[5] .............................................. B23P 19/04

[52] U.S. Cl. ........................................ 29/705; 29/216; 29/219; 29/426.5; 29/888.42; 73/161

[58] Field of Search ...................... 29/888.42, 890.121, 29/890.124, 426.5, 402.03, 402.08, 215, 216, 219, 220, 446, 407, 705; 73/161

[56] References Cited

U.S. PATENT DOCUMENTS

| | | | |
|---|---|---|---|
| 1,656,974 | 1/1928 | Dorman | 29/215 |
| 1,898,720 | 2/1933 | Elder | 29/220 |
| 2,018,219 | 10/1935 | Morgan et al. | 73/161 |
| 2,443,193 | 6/1948 | Necker | 29/219 |
| 2,518,408 | 8/1950 | Weyand | 73/161 |
| 2,616,292 | 11/1952 | Malm | 73/161 |
| 3,640,129 | 2/1972 | Bandimere | 73/161 X |
| 3,793,999 | 2/1974 | Seiler et al. | 29/215 X |
| 4,176,435 | 12/1979 | Castoe | 29/220 |
| 4,186,594 | 2/1980 | Mitchell | 73/161 X |
| 4,223,431 | 9/1980 | Skeels | 29/219 |
| 4,562,629 | 1/1986 | Cerio | 29/888.42 |
| 4,567,634 | 2/1986 | Landry | 29/220 |
| 4,641,521 | 2/1987 | Lawrence | 73/161 |

FOREIGN PATENT DOCUMENTS

| | | | |
|---|---|---|---|
| 194931 | 3/1923 | United Kingdom | 29/219 |

OTHER PUBLICATIONS

Volkswagon Handbook, Clymer Publications, Mar. 1972, p. 50.

*Primary Examiner*—Mark Rosenbaum
*Assistant Examiner*—S. Thomas Hughes
*Attorney, Agent, or Firm*—Ralph W. Selitto, Jr.

[57] ABSTRACT

Apparatus and method for removing, installing and/or testing valve-spring retainer assemblies of internal combustion engines and the like employ an existing spark plug opening to mount a tool which is designed to depress a valve spring and thereby disengage an associated valve-spring retainer assembly. Once it has been disengaged, at least a portion of the valve-spring retainer assembly can be removed from a cylinder head of the engine through the tool.

20 Claims, 6 Drawing Sheets

APPARATUS FOR REMOVING AND INSTALLING VALVE-SPRING RETAINER ASSEMBLIES AND FOR TESTING THE TENSION OF SPRINGS EMPLOYED THEREBY

CROSS REFERENCE TO RELATED APPLICATION

This is a continuation-in-part of application Ser. No. 07/911,283 filed Jul. 9, 1992, now U.S. Pat. No. 5,241,734.

FIELD OF THE INVENTION

The present invention relates generally to the field of internal combustion engines, and, more particularly, to an apparatus and method for removing, installing and testing valve-spring retainer assemblies which are typically employed in such engines.

BACKGROUND OF THE INVENTION

A vast majority of internal combustion engines employ a plurality of cylinders. Typically, each cylinder is provided with at least two valves (one for intake and one for exhaust). Some high performance engines have four valves per cylinder (a pair for intake and a pair for exhaust).

In all cases, the valves are operated against pressure generated by a spring which surrounds a corresponding valve stem and which is interposed between a shoulder or valve guide within the head and a spring retainer removably mounted on an end of the valve stem by a valve lock. In most instances, the valve locks are in the form of a split ring, each ring segment having an inner surface which is keyed to the valve stem and an outer surface which is tapered so as to limit the movement of the valve retainer relative to the valve stem in response to the pressure generated by the spring.

If it is desired to remove a valve spring or the valve itself, it is necessary to first remove the valve lock and the valve retainer. In order to remove the valve lock and the valve retainer, it is necessary to compress the spring far enough to disengage the valve retainer from the valve lock, whereby the valve lock segments are free for removal from their keyed engagement with the valve stem. Such compression of the valve spring is also required when installing or reinstalling the valve retainer and the valve lock.

While devices have, in the past, been developed for assisting in the compression of deep-pocket valve systems, such devices are in the form of large or bench-mounted units which, because of their size and construction, are often difficult to transport and cumbersome to use. A further disadvantage of these prior devices is that they necessitate the removal of the head from the engine block.

SUMMARY OF THE INVENTION

In accordance with the present invention, a conventional spark plug opening is employed to mount an actuating mechanism adapted to actuate a depressing mechanism which has the capability of depressing a valve spring enough to permit the disengagement of an associated valve-spring retainer assembly, whereby the valve spring and/or the valve-spring retainer assembly can be removed from and/or inserted into a cylinder head containing the spark plug opening. The present invention can be utilized to remove or install a plurality of valve-spring retainer assemblies quickly and efficiently. The present invention is also versatile in that it permits such a removal or installation operation to be carried out with the cylinder head in place or with the head removed from the engine block.

Another aspect of the present invention involves using a conventional tool, such as a box wrench, an adjustable wrench, a ratchet wrench or a torque wrench, as the actuating mechanism. Because most mechanics and garages have such tools, the present invention can be marketed without the actuating mechanism, thereby reducing construction costs and facilitating shipping and handling. When a torque wrench is utilized as the actuating mechanism, the present invention has the additional capability of testing the tension of the valve springs, either before or after their removal, in order to determine whether they need to be replaced.

BRIEF DESCRIPTION OF THE DRAWINGS

For a better understanding of the present invention, reference is made to the following description of three exemplary embodiments thereof, considered in conjunction with the accompanying drawings, in which.

DESCRIPTION OF THE EXEMPLARY EMBODIMENTS

Although the present invention is applicable to internal combustion engines of many different types, it is especially suitable for use in connection with internal combustion engines having four valves per cylinder. Accordingly, the present invention will be described conjunction with such engines.

Figure 1:
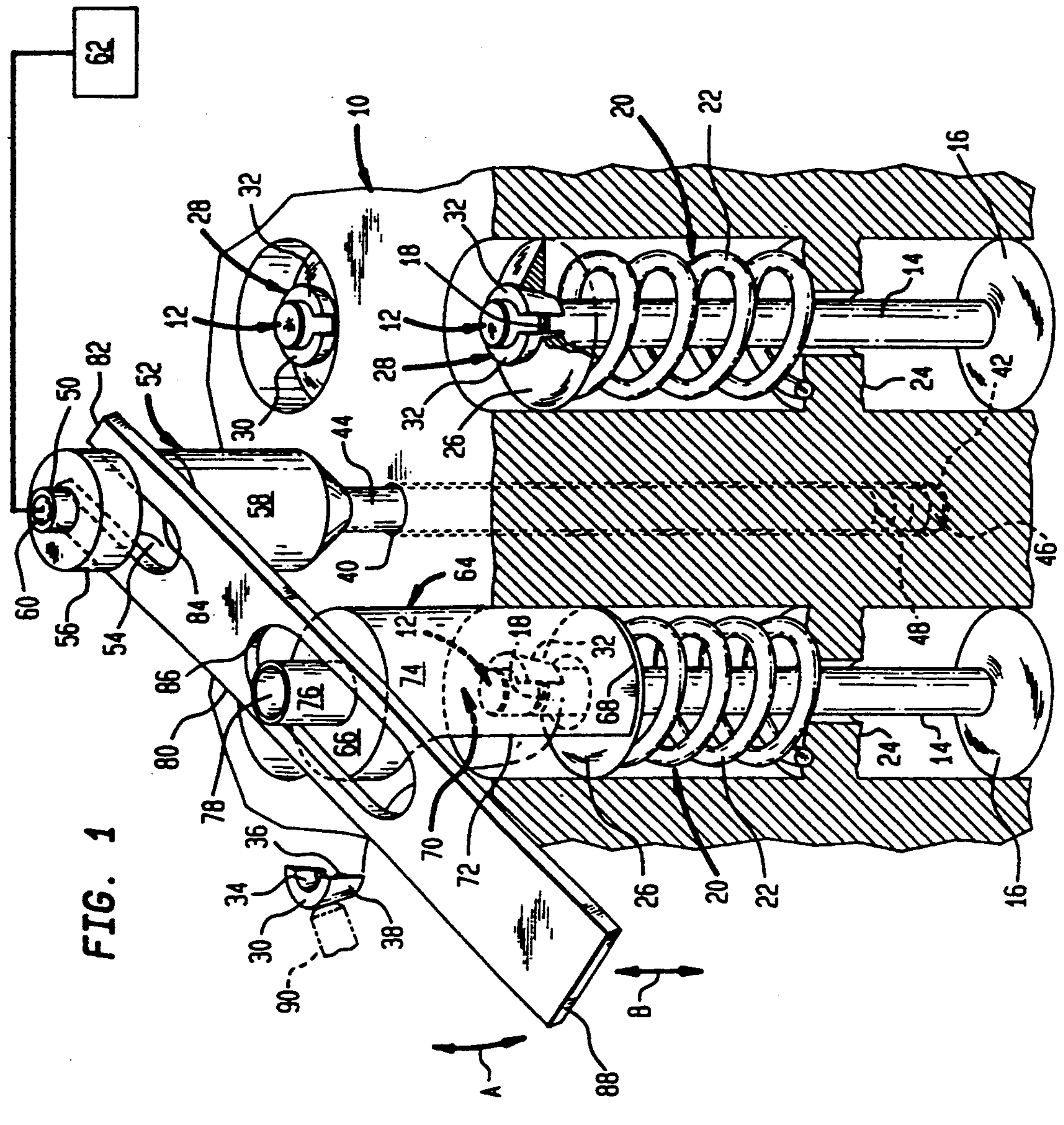
FIG. 1 is a cutaway view of a portion of a cylinder head for an internal combustion engine having four valves per cylinder, one valve being shown in the course of its removal using an apparatus constructed in accordance with a first exemplary embodiment of the present invention.

Referring to FIG. 1, a cylinder head 10 of internal combustion engine has four deep-pocket type valves 12 (only three of which are visible in FIG. 1), each of which includes a stem 14 having a body 16 located at one end of the stem 14 and a circular groove 18 located adjacent to an opposite end of the stem 14. Two of the valves 12 are employed to control the delivery (i.e., intake) of a fuel/air mixture to an associated cylinder (not shown), while the other two valves 12 are employed to control the discharge (i.e., exhaust) of exhaust gases from the associated cylinder.

Each of the valves 12 has its own spring assembly 20 adapted to urge its corresponding valve into a normally closed position which, in the case of the intake valves, prohibits the delivery of the fuel/air mixture to the cylinder, and which, in the case of the exhaust valves, prohibits the discharge of the exhaust gases from the cylinder. The valves 12 are depicted in their closed positions in FIG. 1.

Each of the spring assemblies 20 includes a spring 22 disposed about the stem 14 of a corresponding one of the valves 12 and positioned between a valve guide 24, which is formed integrally with the cylinder head 10, and a spring retainer 26, which has an annular shape so that it can be disposed about the stem 14. The spring 22 urges the retainer 26 into engagement with a valve lock 28, which is in the form of a split ring made from identical ring segments 30, 32. Each of the ring segments 30, 32 has an inner circumferential surface 34, which is provided with an arcuate rib 36 adapted to engage the groove 18 on the valve stem 14 and thereby key the ring segment to the valve stem 14. Each of the ring segments 30, 32 also has an outer circumferential surface 38, which is tapered so as to provide a stop for the spring retainer 26 as it is urged into engagement with the valve lock 28 by the spring 22.

A spark plug opening 40 extends through the cylinder head 10 and terminates in an internally threaded portion 42, which opens into an associated cylinder (not shown) of the internal combustion engine. As is standard practice with internal combustion engines having four valves per cylinder, the spark plug opening 40 is positioned at or near the center of the cluster of the valves 12.

In order to remove one of the springs 22 and/or its associated valve-spring retainer assembly (i.e., the spring retainer 26 and the valve lock 28), a mounting post 44 is inserted into the spark plug opening 40 after the spark plug (not shown) has been removed. One end 46 of the mounting post 44 has external threads 48 adapted to permit the mounting post 44 to be threadedly attached to the internally threaded portion 42 of the spark plug opening 40. An opposite end 50 of the mounting post 44 is in the form of a cylindrical barrel 52 having a circular groove 54 which divides the barrel 52 into an upper barrel section 56 and a lower barrel section 58. The barrel 52 is threadedly attached to the mounting post 44 by providing the lower barrel section 58 with internal threads (not shown) and the adjoining portion of the mounting post 44 with mating external threads (not shown), thereby permitting the height of the barrel 52 to be adjusted for a purpose to be described hereinafter. A bore 60 extends through the mounting post 44 between the ends 46, 50 thereof. A source of pressurized fluid 62 is attached to the bore 60 at the end 50 of the mounting post 44.

Either before or after the mounting post 44 is threaded into the internally threaded portion 42, a depressor 64 is seated on one of the spring retainers 26. The depressor 64 has an upper end 66, a lower end 68 and a hollow internal cavity 70 located between the ends 66, 68. A cutout 72 in an otherwise circular sidewall 74 of the depressor 64 provides access to the internal cavity 70 in a manner to be described hereinafter. A lug 76 projects upwardly from the upper end 66 of the depressor 64. The lug 76 is provided with a passageway 78, which communicates with the internal cavity 70 of the depressor 64 for a purpose which will also be described hereinafter.

Once the mounting post 44 has been threadedly attached to the internally threaded portion 42 of the spark plug opening 40 and the depressor 64 has been seated on the spring retainer 26, an actuating arm 80 is applied to both the mounting post 44 and to the depressor 64. More particularly, one end 82 of the actuating arm 80 has a notch 84 which is sized and shaped so as to permit the end 82 of the actuating arm 80 to be received in the circular groove 54 in such a manner that the actuating arm 80 can rotate around the mounting post 44 (see arrow A in FIG. 1) and can pivot up and down between the upper barrel section 56 and the lower barrel section 58 (see arrow S in FIG. 1). An elongated slot 86 is provided in the actuating arm 80 between the end 82 and an opposite end 88, which functions as a handle. When the notch 84 of the actuating arm 80 has been properly inserted into the circular groove 54 of the mounting post 44, the actuating arm 80 can be lowered onto the upper end 66 of the depressor 64 such that the lug 76 extends through the slot 86.

In use, an operator would grip the end 88 of the actuating arm 80 and depress it until the depressor 64 has, in turn, compressed the spring 22 an amount sufficient to permit the retainer 26 to move out of engagement with its associated valve lock 28. A magnetic wand (depicted in phantom and labeled as reference numeral 90 in FIG. 1) or a similar tool could then be inserted into the internal cavity 70 of the depressor 64 through the cutout 72 in the sidewall 74 thereof. After establishing magnetic contact with one of the ring segments 30, 32 of the valve lock 28, the magnetic wand 90 would be withdrawn from the internal cavity 70 of the depressor 64, thereby removing one of the ring segments 32. The remaining one of the ring segments 30, 32 could then be removed in a similar manner.

With the ring segments 30, 32 removed from the valve stem 14, the retainer 26 and/or the spring 22 would be free for removal once, of course, the depressor 64 and the actuating arm 80 are moved out of the way. In order to remove the other springs 22, there would be no need to remove or reposition the mounting post 44. Only the depressor 64 and the actuating arm 80 would have to be moved. In the event that it is necessary to adjust the height of the pivot point of the actuating arm 80, the barrel 52 can be rotated relative to the rest of the mounting post 44 due to their threaded attachment, thereby raising or lowering the height of the circular groove 54 (i.e., the pivot point) relative the cylinder head 10.

If the foregoing procedure is carried out without removing the cylinder head 10 from the internal combustion engine, then it would be necessary to prevent the valves 12 from falling into their associated cylinders. This is accomplished by supplying pressurized fluid from the source 62 to the cylinders through the bore 60 in the mounting post 44. If the foregoing procedure is carried out after the cylinder head 10 has been removed from the internal combustion engine, then it would not be necessary to employ the source 62 of pressurized fluid.

At the completion of the repair or replacement operation, the ring segments 30, 32 would have to be reinstalled on the valve stem 14. Although it is possible to reinstall the ring segments 30, 32 by inserting them, one at a time, through the cutout 72 in the sidewall 74 of the depressor 64, it may be beneficial to insert the ring segments 30, 32 through the passageway 78 provided in the lug 76 of the depressor 64. In order to reinstall the ring segments 30, 32, it would, of course, be necessary to compress the spring 22 in the manner described above.

While the mounting post 44, the depressor 64 and the actuating arm 80 of this embodiment are separate elements, it should be understood that they could be fixedly attached to each other in order to form a unitary (i.e., integrated) assembly. For instance, the actuating arm 80 could be attached, on the one hand, to the mounting post 44 by a first pivot pin and, on the other hand, to the depressor 64 by a second pivot pin.

Five other exemplary embodiments of apparatus constructed in accordance with the present invention are illustrated in FIGS. 2, 3, 4, 5 and 6 and 7. Elements illustrated in FIGS. 2, 3, 4, 5 and 6 and 7 which correspond to the elements described above with respect to FIG. 1 have been designated by corresponding reference numerals increased by one hundred, two hundred, three hundred, four hundred, and five hundred, respectively. The embodiments of FIGS. 2, 3, 4, 5 and 6 and 7 operate in the same manner as the embodiment of FIG. 1 unless it is otherwise stated.

Figure 2:
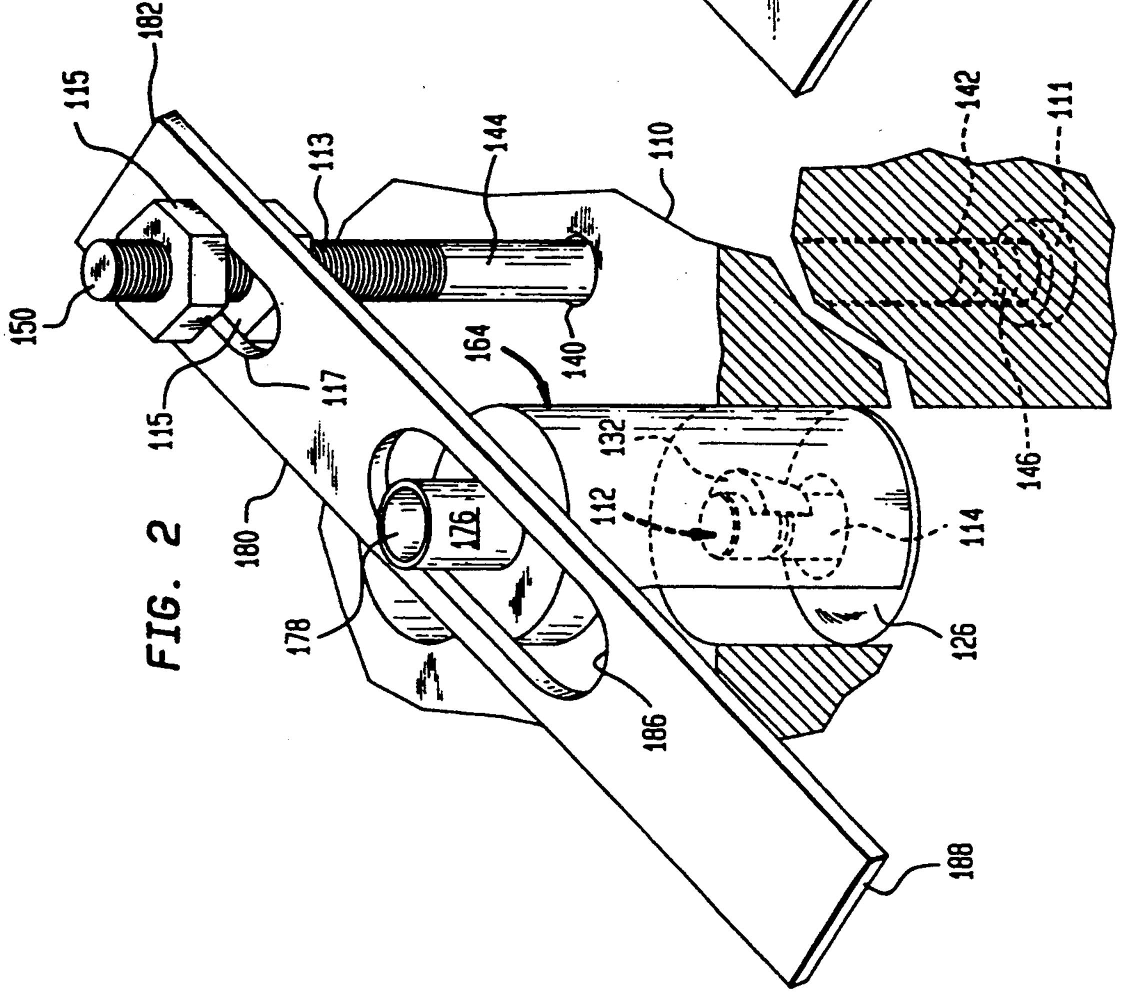
FIG. 2 is a cutaway view of a cylinder head similar to the one illustrated in FIG. 1, one valve being shown in the course of its removal using an apparatus constructed in accordance with a second exemplary embodiment of the present invention.

Referring to FIG. 2, an end 146 of a mounting post 144 has a circular flange 111 which is adapted to abut against an internally threaded portion 142 of a spark plug opening 140 without being threadedly attached thereto. An end 150 of the mounting post 144 is provided with external threads 113 adapted to threadedly engage a pair of spaced-apart nuts 115 such that the position of the nuts 115 on the mounting post 144 can be adjusted to thereby raise or lower the pivot point of an actuating arm 180.

An end 182 of the actuating arm 180 is provided with an elongated slot 117 through which the end 150 of the mounting post 144 extends. The end 182 of the actuating arm 180 is loosely retained between the nuts 115 so as to permit the actuating arm 180 to rotate about the mounting post 144 and to pivot up and down between the nuts 115 (i.e., at the pivot point).

Because the mounting post 144 must be inserted from underneath a cylinder head 110 of an internal combustion engine, the head 110 must be removed prior to the performance of the spring removal operation in accordance with this embodiment of the present invention. In view of the fact that this embodiment requires the removal of the cylinder head 110, the mounting post 144 does not have to be connected to a source of pressurized fluid. It should be understood, however, that the flange 111 could be replaced with external threads and the mounting post 144 could be connected to a source of pressurized fluid in order to avoid the necessity of removing the cylinder head 110.

Figure 3:
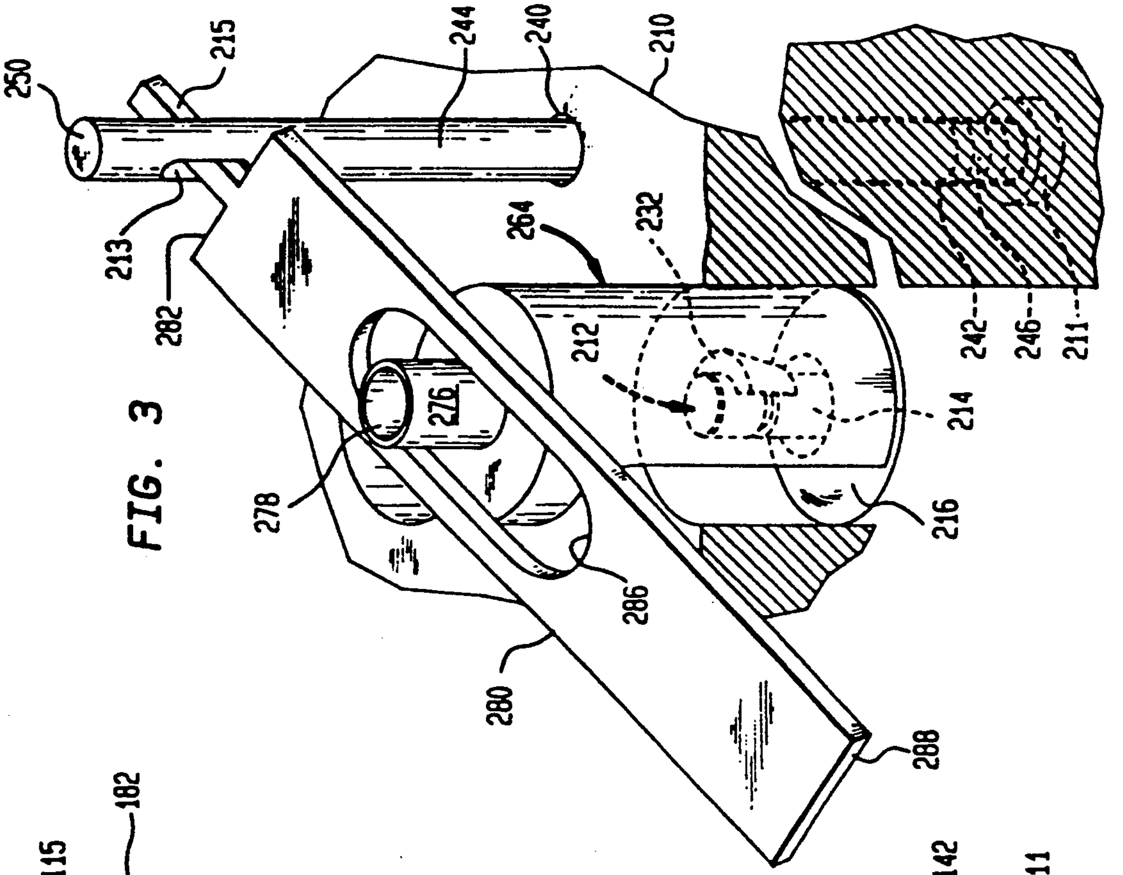
FIG. 3 is a cutaway view of a cylinder head similar to the one illustrated in FIG. 1, one valve being shown in the course of its removal using an apparatus constructed in accordance with a third exemplary embodiment of the present invention.

Referring now to FIG. 3, an end 246 of a mounting post 244 has a circular flange 211, which is adapted to abut against an internally threaded portion 242 of a spark plug opening 240 without being threadedly attached thereto. An end 250 of the mounting post 244 is provided with an elongated slot 213 sized and shaped so as to receive a projection 215, which extends outwardly from an end 282 of an actuating arm 280. The projection 215 is received in the slot 213 in such a manner that the actuating arm 280 can pivot up and down relative to the mounting post 244. The pivot point of the actuating arm 280 can be adjusted by providing the mounting post 244 with a plurality of slots similar to the slot 213.

Unlike the previous two embodiments, this embodiment is designed so that the actuating arm 280 cannot rotate about the mounting post 244. Accordingly, when repositioning the actuating arm 280 in preparation for the performance of a spring removal operation in connection with another valve, it would be necessary to reorient the mounting post 244 or to remove and reapply the actuating arm 280.

Because the mounting post 244 must be inserted from underneath a cylinder head 210 of an internal combustion engine, the head 210 must be removed from the engine block prior to the performance of a spring removal operation in accordance with this embodiment of the present invention. In view of the fact that this embodiment requires the removal of the cylinder head 210, the mounting post 244 does not have to be connected to a source of pressurized fluid. It should be understood, however, that the flange 211 could be replaced with external threads and the mounting post 244 could be connected to a source of pressurized fluid in order to avoid the necessity of removing the head 210.

Figure 4:
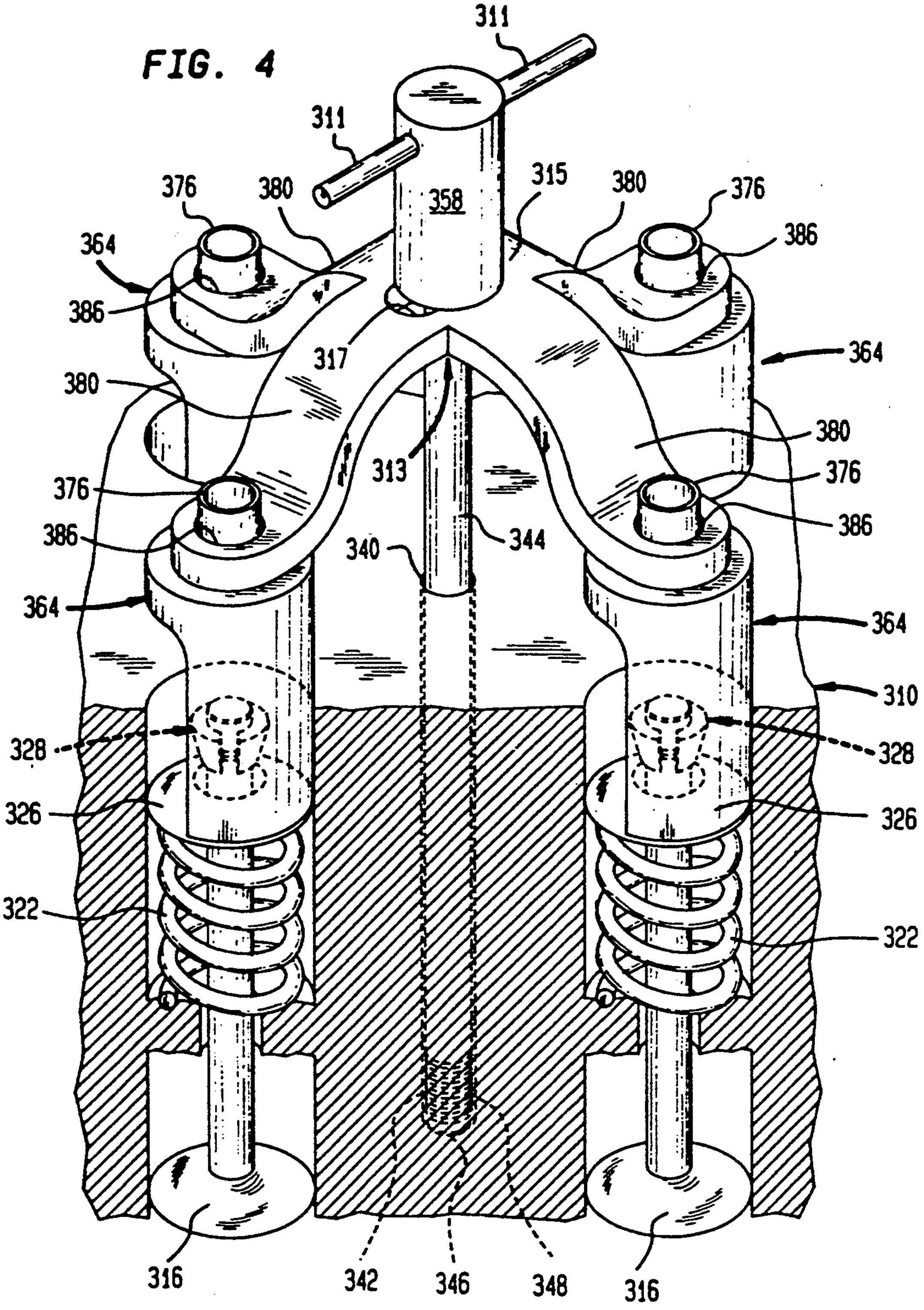
FIG. 4 is a cutaway view of a cylinder head similar to the one illustrated in FIG. 1, all four valves being shown in the course of their removal using an apparatus constructed in accordance with a fourth exemplary embodiment of the present invention.

With reference to FIG. 4, an end 346 of a mounting post 344 is provided with external threads 348 so that the mounting post 344 can be threadedly attached to an internally threaded portion 342 of a spark plug opening 340. A cylindrical barrel 358 is threadedly attached to an adjoining portion of the mounting post 344 so that the barrel 358 can be raised or lowered relative to the rest of the mounting post 344 by rotating the barrel 358 as the mounting post 344 is anchored in the spark plug opening 340. The barrel 358 is provided with a pair of pins 311 adapted to function as a handle for the purpose of facilitating the manual rotation of the barrel 358.

Four actuating arms 380 are joined together to form an integral actuating mechanism 313 having a hub region 315 which is provided with a hole 317 sized and shaped so as to allow the mounting post 344 to extend therethrough, whereby the actuating mechanism 313 is positioned below the barrel 358. Each of the actuating arms 380 has a slot 386 sized and shaped so as to receive a lug 376 of a depressor 364.

In use, the barrel 358 would be rotated in a direction resulting in its downward movement toward a cylinder head 310. As the barrel 358 moves downward toward the cylinder head 310, it first engages the actuating mechanism 313 and then causes the actuating mechanism 313 to move conjointly with it toward the cylinder head 310. During such movement, the actuating arms 380 move in a linear fashion, and, therefore, they do not pivot like the actuating arms 80, 180, 280 of the embodiments illustrated in FIGS. 1–3. Because all four of the actuating arms 380 move conjointly, this embodiment permits all four springs 322 to be depressed simultaneously, thereby further reducing the time required to accomplish their removal and/or the removal of their associated valve-spring retainer assemblies (i.e., the spring retainers 326 and the valve locks 328).

Figure 5:
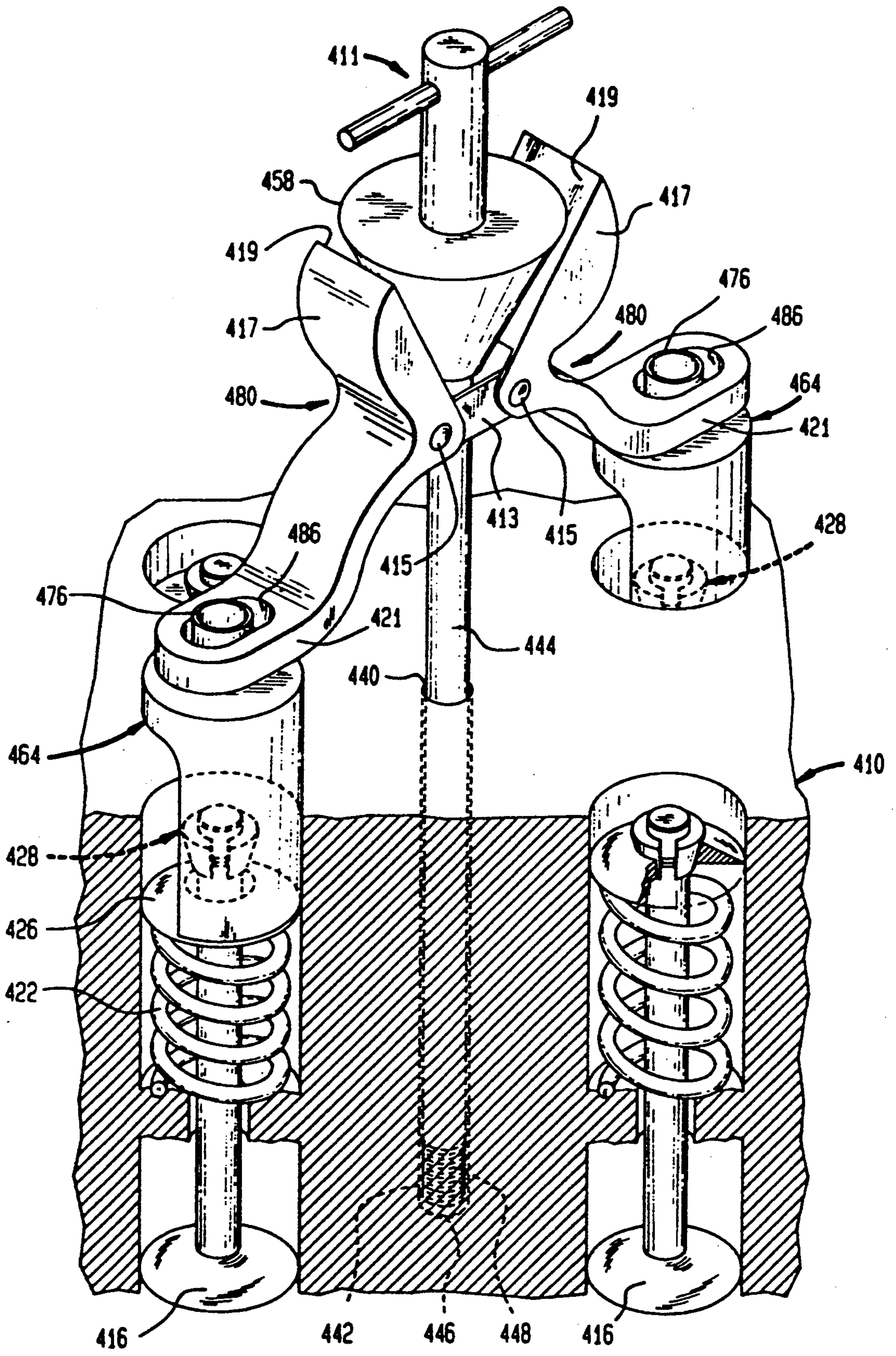
FIG. 5 is a cutaway view of a cylinder head similar to the one illustrated in FIG. 1, two valves being shown in the course of their removal using an apparatus constructed in accordance with a fourth exemplary embodiment of the present invention.

With reference to FIG. 5, an end 446 of a mounting post 444 is provided with external threads 448 so that the mounting post 444 can be threadedly attached to an internally threaded portion 442 of a spark plug opening 440. A conical barrel 458 is threadedly attached to an adjoining portion of the mounting post 444 so that the barrel 458 can be raised or lowered relative to the rest of the mounting post 444 by rotating the barrel 458 as the mounting post 444 is anchored in the spark plug opening 440. The barrel 458 is provided with a handle 411 for the purpose of facilitating the manual rotation of the barrel 458.

Two actuating arms 480 are pivotally mounted from a pair of crossbars 413 (only one being visible in FIG. 5) by pivot pins 415, the crossbars 413 being fixedly positioned on opposite sides of the mounting post 444. Each of the actuating arms 480 has a leg 417, which is provided with a contact surface 419 arranged adjacent to the barrel 458, and another leg 421, which is provided with a slot 486 sized and shaped so as to receive a lug 476 of a depressor 464. The actuating arms 480 can freely pivot about the pivot pins 415 or they can be spring-biased in such a manner that the contact surfaces 419 are constantly urged into engagement with the barrel 458.

In use, the barrel 458 would be rotated in a direction resulting in its downward movement toward a cylinder head 410. As the barrel 458 moves downward toward the cylinder head 410, it causes the actuating arms 480 to pivot conjointly toward the cylinder head 410. During such pivotal movement, the legs 421 simultaneously depress a pair of springs 422, thereby further reducing the time required to accomplish their removal and/or the removal of their associated valve-spring retainer assemblies (i.e., the spring retainers 426 and the valve locks 428).

Figure 6:
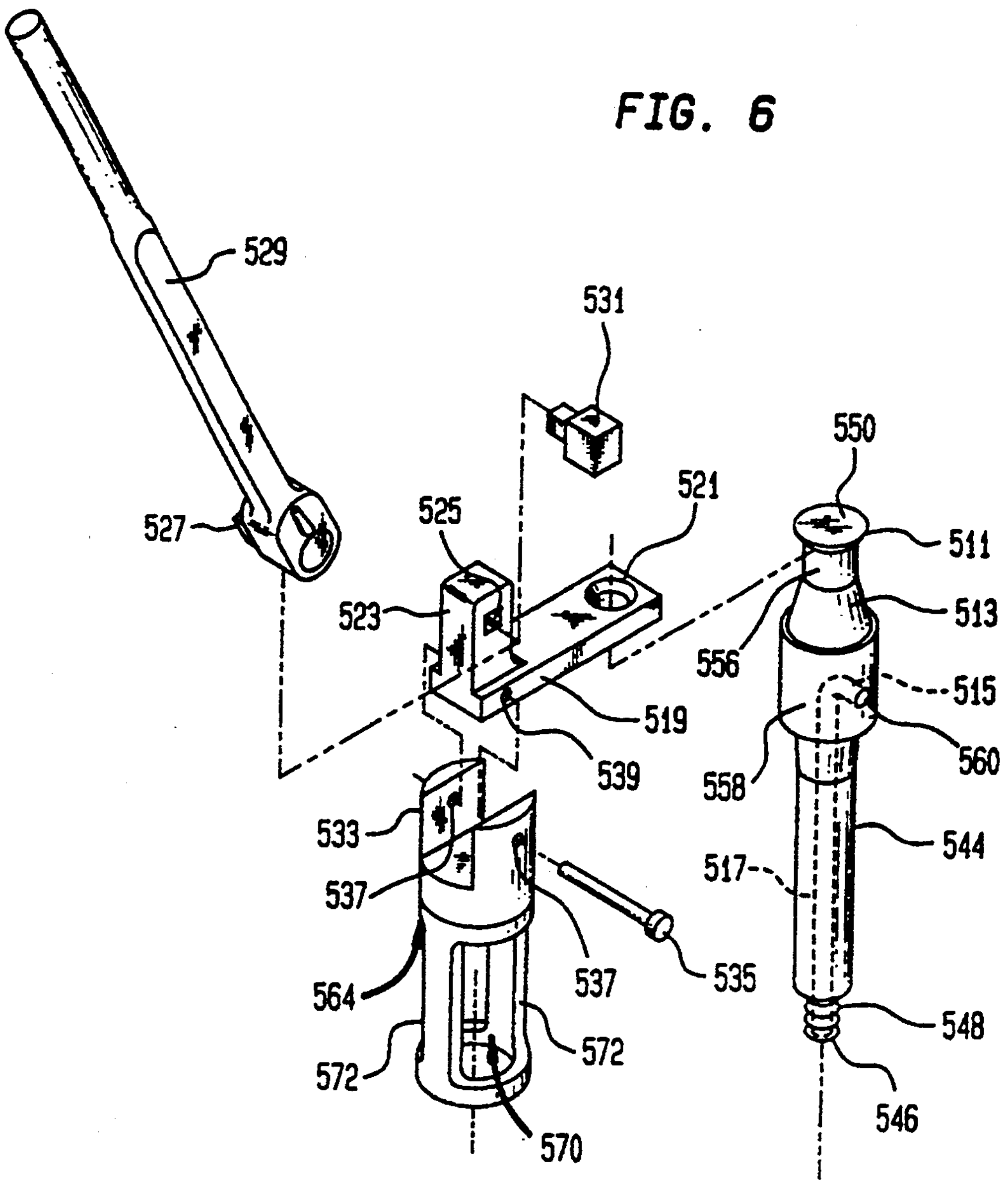
FIG. 6 is an exploded perspective view of a valve spring removing, installing and/or testing apparatus constructed in accordance with a fifth exemplary embodiment of the present invention.

With reference to FIG. 6, an end 546 of a mounting post 544 is provided with external threads 548 so that the mounting post 544 can be threadedly attached to an internally threaded portion (not shown) of a spark plug opening (not shown). An opposite end 550 of the mounting post 544 is in the form of a semi-spherical ball 511 carried by an upper barrel section 556, which is threadedly attached to a conical section 513 interposed between the upper barrel section 556 and a lower barrel section 558. A bore 560 has a radial leg 515, which extends into the lower barrel section 558, and an axial leg 517, which extends from the radial leg 515 to the end 546 of the mounting post 544. A source of pressurized fluid (not shown) can be connected to the bore 560.

A link 519 has a circular hole 521 at one end and a rectangular lug 523 at an opposite end. The hole 521 is sized and shaped so as to form a socket for the semi-spherical ball 511 of the mounting post 544, whereby the link 519 may pivot and rotate relative to the mounting post 544. The lug 523 has a rectangular hole 525 which is sized and shaped so as to removably receive a head 527 of a torque wrench 529 or a similar tool, such as a ratchet wrench. Alternatively, an adaptor 531 can be removably inserted into the hole 525 to provide an interface for other conventional tools, such as an adjustable wrench (e.g., a crescent wrench) or a non-adjustable wrench (e.g., a box wrench or an open-ended wrench).

A depressor 564 has a head 533 which is slotted so as to receive the link 519. A pin 535 extends through a pair of holes 537 provided in the head 533 of the depressor 564 and through a hole 539 provided in the link 519, thereby permitting the depressor 564 to pivot relative to the link 519. The depressor 564 has a pair of cutouts 572, each of which communicates with an internal cavity 570 of the depressor 564.

In use in connection with a spring removal operation, the torque wrench 529 would be set at a value which exceeds the design tension of the valve spring to be removed. After inserting the head 527 of the torque wrench 529 into the hole 525 in the lug 523 of the link 519, an operator would grip the torque wrench 529, which would therefore function as a lever-type handle, and depress it until the depressor 564 has compressed the spring an amount sufficient to permit a retainer (not shown) to move out of engagement with an associated valve lock (not shown).

In use in connection with a spring testing operation, the torque wrench 529 would be set at a value which matches the design tension of the spring, such as by using a chart calculated so as to convert the torque setting (usually expressed in ft-lbs or inch-lbs) of the torque wrench 529 to spring tension (usually expressed in lbs). After completing such a calibration procedure, the torque wrench 529 would be depressed as described above. If the spring is weak and needs to be replaced, it will collapse under the force applied by the torque wrench 529.

Figure 7:
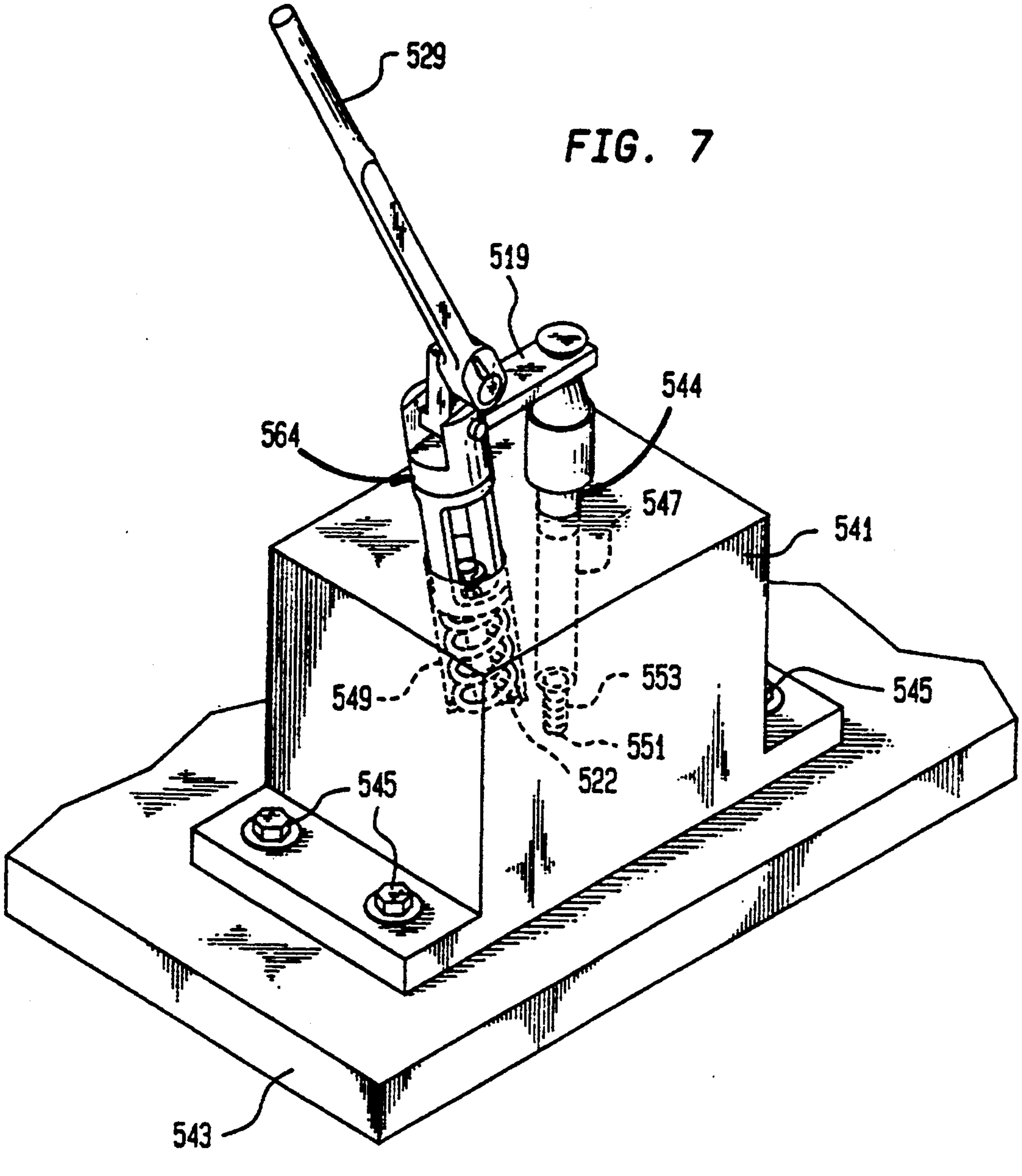
FIG. 7 is a perspective view of the apparatus illustrated in FIG. 6, the apparatus being used in combination with a test stand to perform a spring tension testing operation on a valve spring which has been removed from a cylinder head of an internal combustion engine.

The foregoing test procedure can also be performed subsequent to a spring removal operation. With reference to FIG. 7, a test block 541 is attached to a support surface 543, such as a work bench or the like, by bolts 545. The test block 541 has a pair of blind holes 547, 549. The hole 547 has a lower end 551 which is provided with internal threads 553 adapted to engage the external threads 548 of the mounting post 544 (see FIG. 6). The hole 549 is sized and shaped so as to receive a valve spring 522 which has been removed from a cylinder head of an internal combustion engine.

In use in connection with a spring testing operation, the mounting post 544 would be inserted into the hole 547 in the test block 541 and then threaded in place. The depressor 564 would then be applied directly to the top of the valve spring 522. After calibrating the torque wrench 529 as described above, the torque wrench 529 would be depressed. If the spring 522 is weak and needs to replaced, it will collapse under the force applied by the torque wrench 529.

It will be understood that the embodiments described herein are merely exemplary and that a person skilled in the art may make many variations and modifications without departing from the spirit and scope of the invention. For example, the present invention could be adapted for use in connection with shallow-pocket and similar valve systems. All such variations and modifications are intended to be included within the scope of the invention as defined in the appended claims.

I claim:

1. An apparatus for removing and/or installing valve-spring retainer assemblies from a cylinder head of an internal combustion engine, comprising depressing means for depressing a valve spring enough to disengage an associated valve-spring retainer assembly, whereby the valve spring and/or the valve-spring retainer assembly can be removed from the cylinder head of the engine; actuating means for actuating said depressing means, said actuating means including a first member positioned such that said depressing means is interposed between said first member and the valve-spring retainer assembly, said first member including receiving means for receiving a head of a wrench which functions as a handle for said first member; and mounting means for mounting said actuating means to a spark plug opening in the cylinder head, said mounting means including a second member fixedly positioned relative to the cylinder head and having an elongated body, one end of which is positioned externally of the cylinder head remote from the spark plug opening and an opposite end of which is removably received in the spark plug opening in spaced relation to a valve associated with the valve spring and the valve-spring retainer assembly, and attaching means adjacent to said one end of said body for attaching said second member to said first member such that said first member is movable toward and away from the cylinder head and such that said first member is rotatable about said one end of said body independently thereof, whereby said first member can be repositioned in preparation for the removal of additional valve springs and/or valve-spring retainer assemblies without removing or repositioning said second member.

2. The apparatus according to claim 1, wherein said wrench is a torque wrench, whereby said apparatus may be employed to test the strength of the valve spring.

3. The apparatus according to claim 1, wherein said wrench is a ratchet wrench.

4. The apparatus according to claim 1, wherein said receiving means includes an adaptor sized and shaped so as to be engageable by said wrench.

5. The apparatus according to claim 4, wherein said wrench is an adjustable wrench.

6. The apparatus according to claim 4, wherein said wrench is a non-adjustable wrench.

7. The apparatus according to claim 1, wherein said depressing means depresses the valve spring in response to the movement of said first member toward the cylinder head.

8. The apparatus according to claim 1, wherein said depressing means includes a housing having an internal cavity delimited by a sidewall, and a pair of opposed ends, one of said ends of said housing being substantially open and being sized and shaped so as to be engageable with a spring retainer of the valve-spring retainer assembly, said sidewall of said housing having a cutout which communicates with said internal cavity of said housing and which is sized and shaped so to permit a valve lock of the valve-spring retainer assembly to be inserted into and/or withdrawn from said internal cavity through said cutout.

9. The apparatus according to claim 1, wherein said second member is threadedly engaged with the spark plug opening.

10. The apparatus according to claim 1, wherein said second member has a bore extending from said opposite end thereof to a point intermediate said opposite end and said one end of said second member, said bore being connected to a source of pressurized fluid, whereby pressurized fluid can be supplied to the cylinder head from said source through said bore of said second member.

11. The apparatus according to claim 1, wherein said attaching means is a ball and socket joint, whereby said first member is pivotable and rotatable relative to said second member.

12. The apparatus according to claim 1, wherein said first member includes a lug extending therefrom and said receiving means includes a rectangular aperture provided in said lug.

13. An apparatus for removing, installing and/or testing valve-spring retainer assemblies from a cylinder head of an internal combustion engine, comprising depressing means for depressing a valve spring enough to disengage an associated valve-spring retainer assembly, whereby the valve spring and/or the valve-spring retainer assembly can be removed from a cylinder head of the engine; actuating means for actuating said depressing means, said actuating means including a torque wrench and a first member positioned such that said depressing means is interposed between said first member and the valve-spring retainer assembly, said first member including receiving means for receiving a head of said torque wrench such that said torque wrench functions as a handle for said first member and permits said apparatus to be employed to test the strength of the valve spring; and mounting means for mounting said actuating means to a spark plug opening in the cylinder head, said mounting means including a second member fixedly positioned relative to the cylinder head and having an elongated body, one end of which is positioned externally of the cylinder head remote from the spark plug opening and an opposite end of which is removably received in the spark plug opening in spaced relation to a valve associated with the valve spring and the valve-spring retainer assembly, and attaching means adjacent to said one end of said body for attaching said second member to said first member such that said first member is movable toward and away from the cylinder head and such that said first member is rotatable about said one end of said body independently thereof, whereby said first member can be repositioned in preparation for the removal of additional valve springs and/or valve-spring retainer assemblies without removing or repositioning said second member.

14. The apparatus according to claim 13, wherein said depressing means depresses the valve spring in response to the movement of said first member toward the cylinder head.

15. The apparatus according to claim 13, wherein said depressing means includes a housing having an internal cavity delimited by a sidewall and a pair of opposed ends, one of said ends of said housing being substantially open and being sized and shaped so as to be engageable with a spring retainer of the valve-spring retainer assembly, said sidewall of said housing having a cutout which communicates with said internal cavity of said housing and which is sized and shaped so to permit a valve lock of the valve-spring retainer assembly to be inserted into and/or withdrawn from said internal cavity through said cutout.

16. The apparatus according to claim 13, wherein said second member is threadedly engaged with the spark plug opening.

17. The apparatus according to claim 13, wherein said second member has a bore extending from said opposite end thereof to a point intermediate said opposite end and said one end of said second member, said bore being connected to a source of pressurized fluid, whereby pressurized fluid can be supplied to the cylinder head from said source through said bore of said second member.

18. The apparatus according to claim 13, wherein said attaching means is a ball and socket joint, whereby said first member is pivotable and rotatable relative to said second member.

19. The apparatus according to claim 13, wherein said first member includes a lug extending therefrom and said receiving means includes a rectangular aperture provided in said lug.

20. The apparatus according to claim 13, wherein said torque wrench has adjustable settings.

* * * * *